United States Patent Office 3,135,772
Patented June 2, 1964

3,135,772
16-DIAZO ESTRONE ETHERS AND
PREPARATION THEREOF
Ajay K. Bose, Hoboken, N.J., assignor to The Upjohn
Company, Kalamazoo, Mich., a corporation of
Delaware
No Drawing. Filed Apr. 13, 1962, Ser. No. 187,225
3 Claims. (Cl. 260—397.4)

This invention relates to novel organic compounds of the following structural formula, pharmaceutical compositions thereof, and to novel methods for the preparation of the compounds:

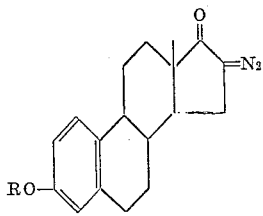

This compound is useful as an intermediate for the preparation of 16-halo-estrones, such as, 16α-fluoro-estrone, 16β-fluoro-estrone and the corresponding 16α- and 16β-chloro-, iodo-, and bromo-estrones.

The compounds of the above formula are also useful as potent lipid-shifting agents without feminizing effects and are useful in the treatment of inflammatory diseases, disturbances in sodium retention and water balance in the body of animals utilizing sodium in the hydrostatic system, adrenal gland malfunctions, and abnormal mental and central nervous system behavior.

The compounds can be administered in conventional unit dosage form, admixed with conventionally acceptable pharmaceutical carriers or diluents, such as, lactose, calcium carbonate, starch, sucrose, and the like and can be prepared in the form of pills, capsules, tablets, oluses, feeds, powders, and the like. The compounds can also be administered parenterally when prepared in suitable media for injection in accordance with known methods of preparing anti-inflammatory steroidal hormonal compounds for this purpose.

In the formula above, R is a lower-alkyl or cycloalkyl group containing from 1 to 8 carbon atoms as, for example, methyl, ethyl, propyl, butyl, isobutyl, cyclopentyl, hexyl, cyclohexyl, 2,2-dimethylhexyl, n-octyl and the like.

The preparation of the novel compounds of this invention can be accomplished using estrone-3-alkyl ethers and transforming these to the corresponding oximino compounds by reaction with an alkyl nitrite, such as, butyl nitrite. The reaction is carried out preferably in an alkaline alkanol reaction mixture. The 16-oximino compound thus produced is converted to the corresponding 16-diazo compound by reaction with chloramine or its chemical equivalent, such as a mixture of ammonia and an alkali metal hypochlorite. The reaction is carried out preferably in a partly aqueous solution.

The following specific examples are illustrative of the invention.

Example 1.—16-Oximino-3-Methoxy-1,3,5(10)-Estratrien-17-One

To a suspension of 20.77 g. estrone-3-methylether in 150 ml. potassium tertiary butoxide and 50 ml. of tertiary butyl alcohol was added 15 ml. of butyl nitrite. After stirring under $N_2$ at 40° C. for 18 hours, a mixture of ice and water was added. After one extraction with ether, the aqueous solution was brought to pH 3–4 with acetic acid, whereupon the product precipitated. Yield of 18.89 g., 91 percent, melting at 165–171° C. with decomposition. Recrystallization from methanol brought the melting point to 183.5–185° C.

Example 2.—16-Diazo-3-Methoxy-1,3,5(10)-Estratrien-17-One

To a stirred mixture of 6.2 g. 16-oximino-3-methoxy-1,3,5(10)-estratrien-17-one, produced in Example 1, 25 ml. one normal sodium hydroxide, 200 ml. of water and 300 ml. diethyl ether at 0–3° was added 5 ml. ammonium hydroxide. Keeping the temperature at 0–5° C., 70 ml. Clorox (sodium hypochlorite) was added dropwise over a period of 20–30 minutes. After stirring for 6 hours at 0–5°, the ether layer was separated. The aqueous layer was extracted with 3–100 ml. portions of ether. The combined ether solutions were dried and then evaporated to dryness. Yield 3.5 g., M.P. 141.5–144° C. Recrystallization from ether gave 1.75 g., M.P. 143–145° C. Infrared analysis showed characteristic diazoketone absorptions.

Estrone 3-ethyl ether, estrone 3-propyl ether, and estrone 3-cyclopentyl ether can be substituted for estrone 3-methyl ether in the procedure of Example 1 to produce respectively as a light colored crystalline product, 16 - oximino-3-ethoxy - 1,3,5(10)-estratrien-17-one, 16-oximino - 3-propoxy - 1,3,5(10)-estratrien-17-one, and 16 - oximino-3-cyclopentyloxy - 1,3,5(10)-estratrien-17-one.

These three products can be substituted in place of 16-oximino-3-methoxy-1,3,5(10)-estratrien-17-one in the procedure of Example 2 to produce respectively as a light colored crystalline product 16-diazo-3-ethoxy-1,3,5(10)-estratrien-17-one, 16 - diazo-3-propoxy-1,3,5(10)-estratrien-17-one, and 16-diazo-3-cyclopentyloxy-1,3,5(10)-estratrien-17-one, each showing infrared analyses with characteristic diazo ketone absorptions.

The 16-diazo compounds of this invention can be reacted with hydrogen fluoride or other hydrogen halide in accordance with the procedure of Reich and Reichstein, Helvetica Chimica Acta, 22, 1124 (1939) to produce the corresponding 16-fluoro or other 16-halo products. The 16α-halo and 16β-halo epimers can be separated from the reaction mixture by known methods, such as, chromatography, selective crystallization or counter current extraction, and the like. The 16α-fluoro or 16β-fluoro or other 16-halo compounds, e.g., 16β-fluoro - 3-methoxy - 1,3,5(10-estratrien-17-one, 16α-fluoro-3-methoxy-1,3,5(10)-estratrien - 17 - one possess gonadotropic inhibiting and lipid regulating activity and are useful in the treatment of hypercholesterolemia, and can be administered in the form of oral tablets.

I claim:
1. A compound of the formula:

wherein R is selected from the group consisting of lower-alkyl and cycloalkyl containing from 1 to 8 carbon atoms.
2. 16-diazo-3-methoxy-1,3,5(10)-estratrien-17-one.
3. A method for the preparation of 16-diazo-3-lower alkoxy-1,3,5(10)-estratrien-17-ones which comprises reacting 16-oximino - 3 - lower-alkoxy-1,3,5(10)-estratrien-17-one with chloramine.

References Cited in the file of this patent

Cava et al.: "Journal of American Chemical Society, Jan. 5, 1962, vol. 84, pages 115–116 relied on.